United States Patent [19]
Calderbank et al.

[11] Patent Number: 5,912,932
[45] Date of Patent: Jun. 15, 1999

[54] APPARATUS AND METHODS FOR DECODING A COMMUNICATION SIGNAL

[75] Inventors: Arthur Robert Calderbank, Princeton, N.J.; Gregory J. Pottie, Los Angeles, Calif.; Nambirajan Seshadri, Chatham, N.J.

[73] Assignee: Lucent Technologies Inc., Murray Hill, N.J.

[21] Appl. No.: 08/427,030

[22] Filed: Apr. 24, 1995

[51] Int. Cl.[6] .................................. H03D 1/04; H04B 1/10
[52] U.S. Cl. ..................... 375/346; 348/607; 455/296; 327/551
[58] Field of Search ........................................ 375/346, 347, 375/348; 455/296; 348/607; 327/310, 551

[56] References Cited

U.S. PATENT DOCUMENTS

| | | |
|---|---|---|
| 5,440,582 | 8/1995 | Birchler et al. .......................... 375/346 |
| 5,452,015 | 9/1995 | Hulyalkar ................................. 375/346 |
| 5,469,465 | 11/1995 | Birchler et al. ......................... 375/346 |
| 5,570,395 | 10/1996 | Myers ...................................... 375/346 |

*Primary Examiner*—Temesghen Ghebretinsae

[57] ABSTRACT

Apparatus and methods are provided for adaptively decoding communication signals. A received input signal, representing a communication between a first node and a second node, is processed to produce an output signal. The received input signal includes a desired data signal and at least one interfering signal. The desired data signal includes at least one data set and is preferably encoded using one of a linear combination code and an algebraic combination code. The input signal is processed by identifying at least a portion of the desired data signal within the input signal and isolating the desired data signal with respect to the one or more interfering signals to produce the output signal. The output signal represents the desired data signal.

23 Claims, 8 Drawing Sheets

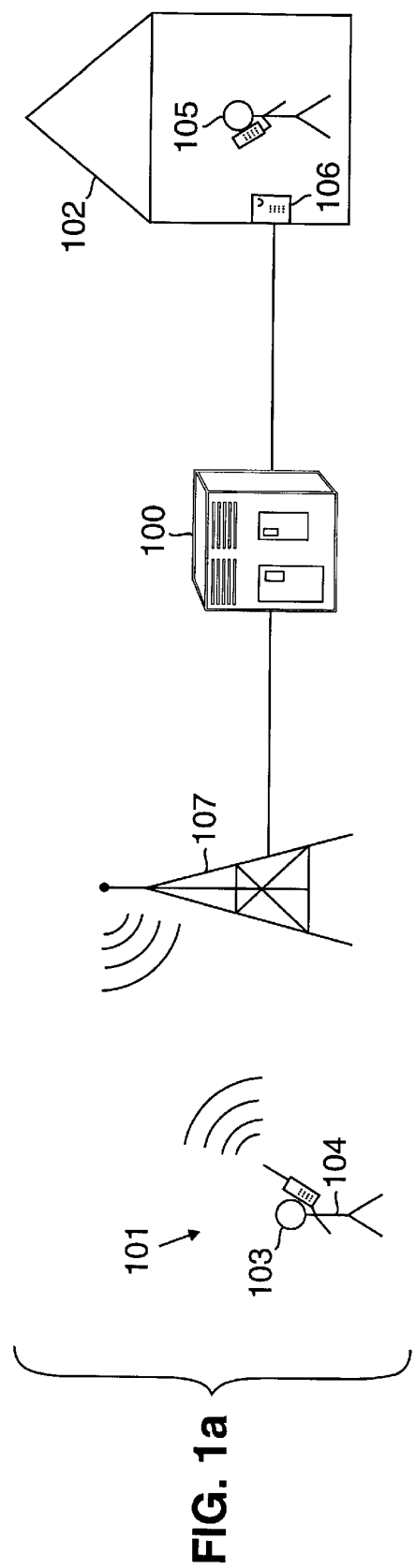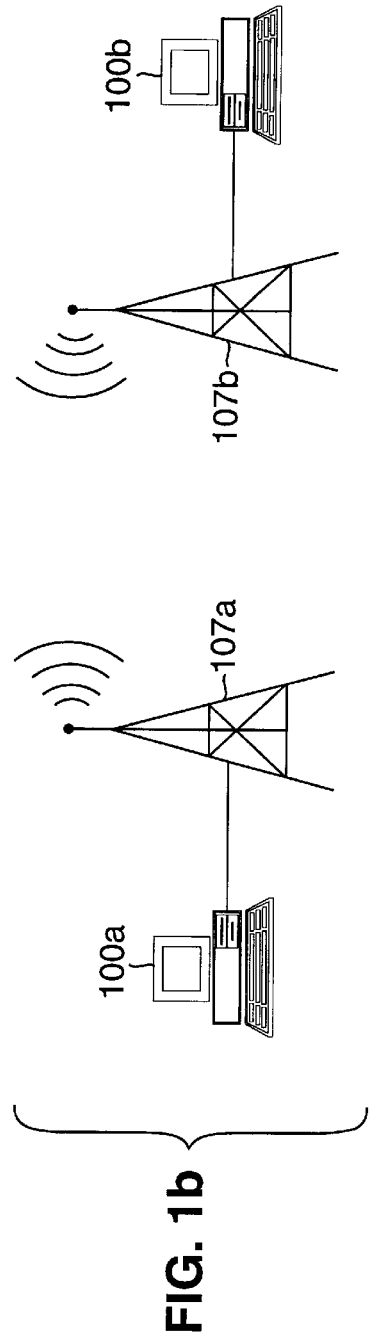

APPARATUS AND METHODS FOR DECODING A COMMUNICATION SIGNAL

TECHNICAL FIELD OF THE INVENTION

The present invention relates generally to signal processing, and in particular to apparatus and methods for decoding a communication signal.

BACKGROUND

Data communication has been with us for a long time. Smoke signals, drum beats, horn and bugle calls, and the telegraph, are all traditional examples of communication systems. More contemporary systems include the conventional telephone, and more recently, the computer network. The effectiveness of any traditional or contemporary system to communicate information is related to the particular system's ability to overcome two obstacles, namely, interference and noise.

Interference occurs when a desired signal and one or more unwanted signals are received at or near the same time. Interference causes the desired signal to be incorrectly received due to the reception of the unwanted signal. For example, assume that A and B are communicating with one another by beating their respective drums. While A and B communicate, C begins beating its drum. C's signals are received by A and B causing their communication to be partially, or even completely, meaningless. C's signal is said to interfere with the communication between A and B. Interference therefore is the presence of at least one unwanted communication signal which interferes with the reception of a desired communication signal.

Noise, on the other hand, is another disturbance introduced into a communication system which is not an interfering signal. Noise may partially, or completely, distort or garble the information content of the desired signal. To continue with the above example, assume that while A and B are communicating, a freight train passes between them. The noise from the freight train at least partially disturbs A's and B's communication. Noise therefore is any disturbance that affects a desired communication signal and is not an interfering signal. The static received during a telephone call is another example of noise.

Contemporary computer network and telephone systems have traditionally been "wired" communication systems. In other words, each computer or telephone is physically joined with one or more other computers or telephones using a wire, fiber optic cable, or another suitable communication medium. Each computer, group of related computers, or telephony system is referred to as a node within these communication systems. A node is a junction point within a communication system.

Wireless communication between the nodes of communication systems is becoming increasingly widespread. As a result of this increased ubiquity, an ever increasing number of people are communicating using wireless signals, and thereby increasing the potential for interference. In cellular telephony systems for example, it is common for two people located relatively close to one another, and who are involved in two separate conversations, to interfere with one another's communication signal.

Conventional attempts to solve this problem include without limitation, modeling interference as noise and using error control coding to mitigate the effects, implementing systems with multiple antennas, and using power control to limit the effect of spatially distant nodes utilizing the same transmission frequency. These solutions however fail to address the fundamental issue, namely that interference is caused by another user, in turn causing less than optimal decoding of received signals. This results in performance degradation. The inability of conventional solutions to substantially eliminate the effects of interference and noise remain a dominant obstacle to producing cost-effective and more commercially successful products.

SUMMARY OF THE INVENTION

Broadly, the present invention is directed to apparatus and methods for adaptively decoding communication signals. The principles of the present invention may accordingly be implemented in, or utilized in conjunction with, any suitable communication and/or signal processing system. Exemplary communication systems include without limitation, telephony systems (including videophone and cellular technologies), processing system networks (including local and wide area networks), direct television systems, satellite systems, land-mobile radio systems, broadcast systems, data storage and retrieval systems, and the like.

An apparatus for adaptively decoding communication signals in accordance with the principles of the present invention preferably includes receiving and processing means. The receiving means operates to receive an input signal that represents a communication between a first node and a second node. The input signal includes a desired data signal and at least one interfering signal. The desired data signal is encoded using a combination code, and preferably includes at least a first data set. The processing means operates to decode the input signal to produce an output signal. The output signal represents the desired data signal.

The processing means, more particularly, identifies at least a portion of the desired data signal within the input signal, preferably by recognizing and utilizing the first data set. The processing means then isolates the desired data signal from the one or more interfering signals to produce the output signal. An important aspect of any apparatus in accordance with the present invention is that it may be processing system, firmware or hardware based.

A method in accordance with the principles of the present invention concerns the adaptive decoding of communication signals. The method includes the steps of receiving, identifying, suppressing and producing signals. More particularly, an input signal representing a communication between a first node and a second node is received. The input signal includes a first data set and a second data set, wherein at least the first data set is encoded in either a linear or an algebraic combination code format, and preferably includes at least a first data subset. At least a portion of the first data set is identified, preferably by recognizing and utilizing the first data subset. The identified first data set is suppressed with respect to the second data set. An output signal representing the first data subset is produced.

One embodiment for using and/or distributing the present invention is as software. The software includes a plurality of processing system instructions which are stored to a conventional storage medium. The processing system instructions are readable by a processing system. The processing system instructions, upon execution, operate to control at least one processing system to cause it to adaptively decode a received input signal representing a communication in accordance with the present invention. Preferred storage media include without limitation, magnetic, optical, and semiconductor, as well as suitably arranged combinations thereof.

The processing system instructions cause the processing system to store the received input signal. The input signal includes at least two signals. A first data signal is encoded in either one of a linear or an algebraic combination code format, and includes at least a first data set. At least a portion of the first data signal is identified, preferably by recognizing and utilizing the first data set, and isolated with respect to one or more remaining interfering signals within the input signal. An output signal representing the first data signal is produced.

BRIEF DESCRIPTION OF THE DRAWINGS

For a more complete understanding of the present invention, and the advantages thereof, reference is made to the following Detailed Description of the Invention, taken in conjunction with the accompanying drawings in which like numbers designate like parts, and in which:

FIGS. 1a and 1b illustrate block diagrams of exemplary communication systems;

DETAILED DESCRIPTION OF THE INVENTION

Figure 1C:
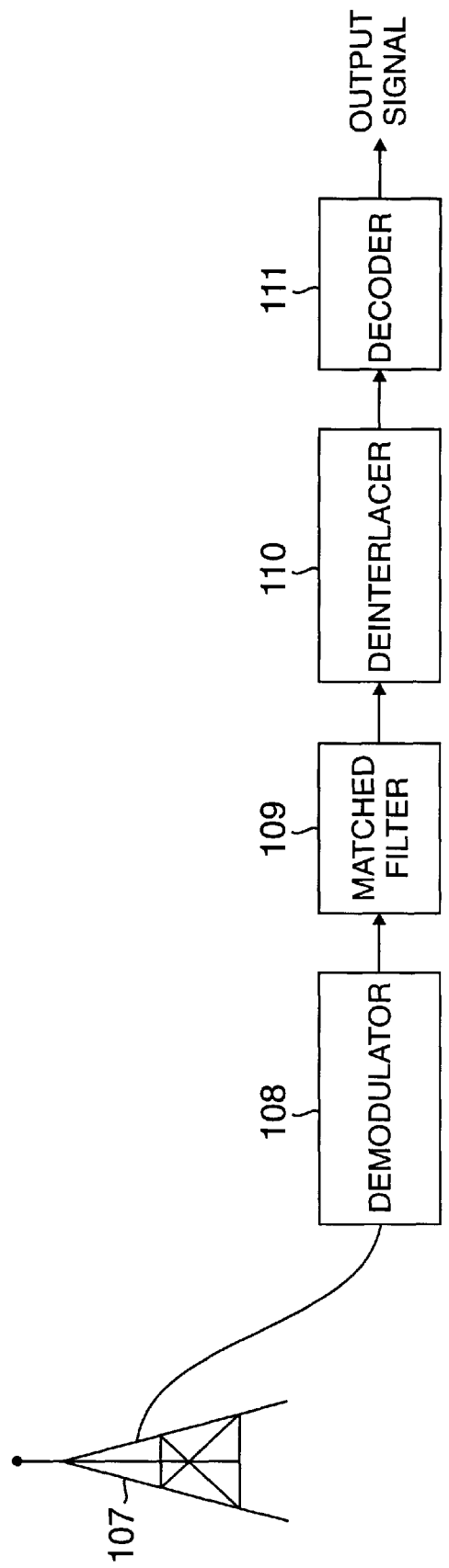
FIG. 1c illustrates a block diagram of an exemplary digital data receiver.

FIGS. 1a and 1b illustrate block diagrams of exemplary communication systems. In FIG. 1a, a conventional telephone communication system is presented wherein a processing system 100 is used to facilitate communication between a first node 101 and a second node 102. The first node 101 includes a first caller 103, shown utilizing a cellular telephone 104. The cellular telephone 104 is operable to send and receive wireless communication signals. The second node 102 includes a second user 105, shown utilizing a conventional telephone 106. The conventional telephone 106 is operable to send and receive wired communication signals. The exemplary processing system 100, illustrated as a mainframe computer, is coupled with the conventional telephone 106 and a suitably arranged antenna 107. Antenna 107 operates to send and receive wireless signals to and from the cellular telephone 104.

In FIG. 1b, a conventional wireless communication system is presented wherein a first node, processing system 100a, is communicating with a second node, processing system 100b. The exemplary processing systems 100a, 100b, illustrated as personal computers, are each coupled with a suitably arranged antenna 107a and 107b, respectively. Processing systems 100a and 100b utilize wireless communications via antennas 107a and 107b, respectively, to communicate.

Computer networks may be implemented locally in local area networks ("LANs"), or alternatively, in wide area networks ("WANs") wherein particular nodes are located relatively distant from one another. An intermediate processing system, such as processing system 100 in FIG. 1a, may be used to facilitate communications therebetween.

Inclusion of the exemplary communication systems of FIGS. 1a and 1b is for illustrative purposes only. The techniques for decoding communication signals in accordance with the present invention may be used in conjunction with any suitably arranged communication system operable to receive communication signals, whether wired or wireless. Exemplary communication systems accordingly include, without limitation, telephony systems (including videophone and cellular technologies), direct television systems, processing system networks (including local and wide area networks), satellite systems, land-mobile radio systems, data storage and retrieval systems, and the like. In particular, the present invention is particularly advantageous when utilized in conjunction with wireless and optical communication signals.

FIG. 1c illustrates a block diagram of an exemplary digital data receiver in accordance with the principles of the present invention. The exemplary receiver may be implemented within any device suitable for receiving and processing a wireless communication, including without limitation, radios, satellites, telephones, videophones, televisions and processing systems.

The exemplary receiver includes, for illustrative purposes, a conventional antenna 107, a demodulator 108, a matched filter 109, a de-interlacer 110 and a decoder 111. Conventional antenna 107 operates to receive a wireless communication generated by a suitably arranged conventional transmitter (not shown), and in response thereto, to produce a modulated signal. The modulated signal is input to demodulator 108, which demodulates the signal. The signal is input to matched filter 109, which operates to remove noise that is outside a particular bandwidth of interest. The sampled outputs of the matched filter, which were preferably sampled at a particular instant in time and preferably at once per data symbol duration, are input to de-interlacer 110, which is operable to convert an interlaced signal to its original form. The signal is input to decoder 111 which is operable to adaptively decode the received signal to generate an output signal representing a desired data signal.

Figure 2:
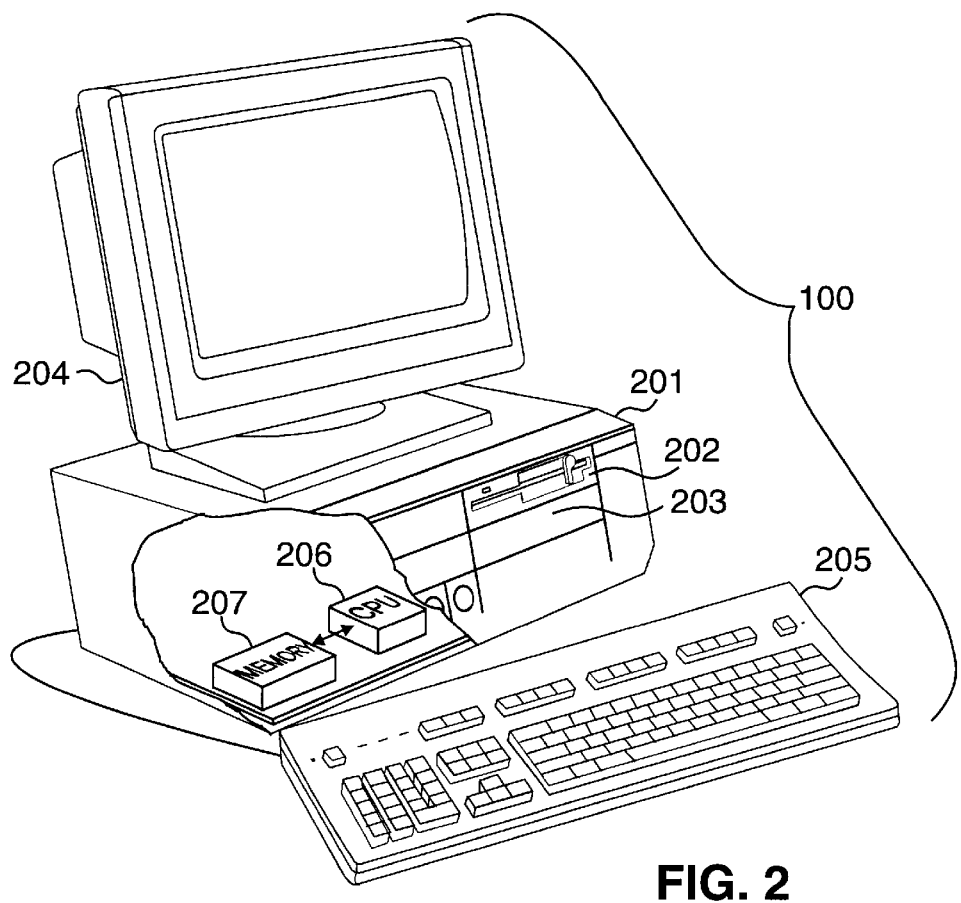
FIG. 2 illustrates an isometric view of one illustrative processing system which may be programmed to adaptively decode wireless communication signals in accordance with the principles of the present invention.

FIG. 2 illustrates an isometric view of an illustrative processing system, a personal computer 100, which may be programmed to adaptively decode a received input signal to generate an output signal representing at least one data signal in accordance with the present invention. The input signal is representative of a communication between at least two nodes of a communication system. Both the input and output signals are real-physical signals. The output signal is representative of at least a portion of the processed input signal.

Personal computer 100 includes a hardware casing 201 (illustrated having a cut-away view), a monitor 204 and a keyboard 205. In accordance with the illustrated embodiment, monitor 204 and keyboard 205 may be replaced by, or combined with, other suitably arranged output and input devices, respectively. Hardware casing 201 includes both a floppy disk drive 202 and a hard disk drive 203. Floppy disk drive 202 is operable to receive, read and write to external disks. Hard disk drive 203 is operable to provide fast access data storage and retrieval.

Floppy disk drive 202 may be replaced by or combined with any suitably arranged structure for receiving and transmitting data, including without limitation, tape and compact disc drives, and serial and parallel data ports. An important aspect of the exemplary embodiment is that data collection and processing need not occur coincidentally. For example, large data transfers, such as those often associated with communication and processing system networks, may be received, stored and later decoded.

A processing unit 206 is illustrated within the cut away portion of hardware casing 201. Processing unit 206 is coupled with a memory storage device 207. Memory storage device 207 may be any suitable memory storage device, such as, a random access memory ("RAM") or a read only memory ("ROM"), to name two examples. Although personal computer 100 is shown having a single processing unit, a hard disk drive and a memory unit, personal computer 100 may be equipped with a plurality of processing units and/or suitably arranged memory storage devices, or suitable combination thereof, operable to cooperatively carry out the principles of the present invention.

Although personal computer 100 is utilized to illustrate one exemplary processing system, the principles of the present invention may be implemented within any processing system having at least one processing unit and a means for receiving an input data signal representing a communication between at least two nodes, including without limitation, radio and broadcast devices, telephony devices, sophisticated calculators, and hand held, laptop/notebook, mini, mainframe and super computers, including RISC and parallel processing architectures, as well as processing system network combinations of the foregoing. Conventional processing system architecture is more fully discussed in *Computer Organization and Architecture*, by William Stallings, MacMillan Publishing Co. (3rd ed. 1993), which is incorporated herein by reference.

Alternate exemplary embodiments may be implemented in firmware or hardware, including without limitation, suitably arranged circuitry such as programmable logic devices, including without limitation, PALs (programmable array logic) and PLAs (programmable logic arrays), DSPs (digital signal processors), FPGAs (field programmable gate arrays), ASICs (application specific integrated circuits), and the like.

Figure 3:
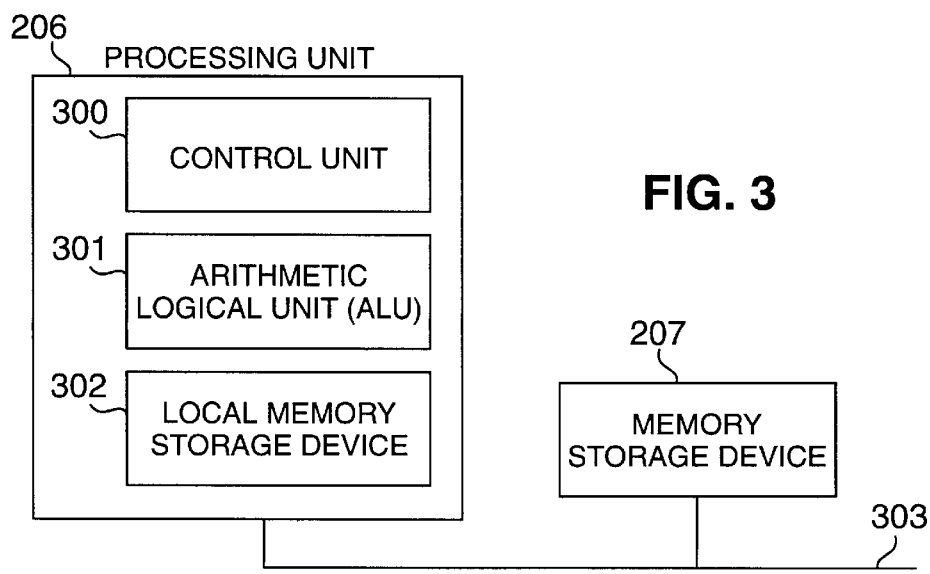
FIG. 3 illustrates a block diagram of one exemplary microprocessing system which may be utilized in conjunction with the illustrative processing system of FIG. 2.

FIG. 3 illustrates a block diagram of an illustrative microprocessing system, including a processing unit and a memory storage device, which may be utilized in conjunction with personal computer 100, or any other processing system. The microprocessing system includes a single processing unit 206 coupled via data bus 303 with a single memory storage device 207, such as the RAM or ROM discussed in conjunction with FIG. 2, for example. Memory storage device 207 is operable to store one or more processing system instructions which processing unit 206 is operable to retrieve and execute. Exemplary processing unit 206 includes a control unit 300, an arithmetic logic unit ("ALU") 301, and a local memory storage device 302, such as, stackable cache or a plurality of registers, for example. Control unit 300 is operable to fetch one or more processing system instructions from memory storage device 207. ALU 301 is operable to perform a plurality of operations, including addition and Boolean AND needed to carry out those instructions. Local memory storage device 302 is operable to provide local high speed storage used for storing temporary results and control information.

Figure 4:
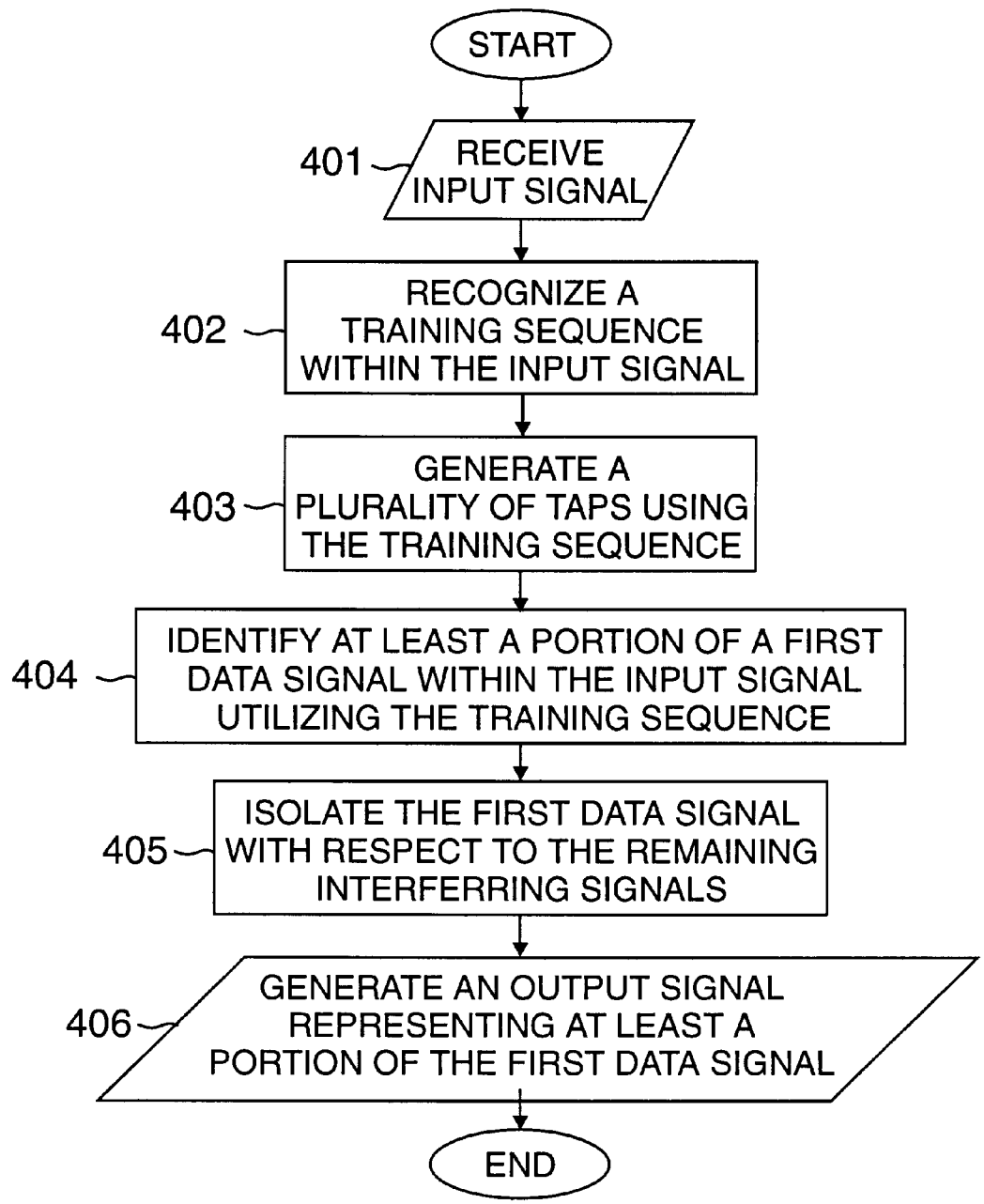
FIG. 4 illustrates a flow diagram of one exemplary process for decoding a wireless communication in accordance with the principles of the present invention.

FIG. 4 illustrates a flow diagram of one exemplary process for decoding communication signals in accordance with the principles of the present invention wherein time diversity techniques are preferably used to suppress interfering signals. Time diversity is preferably achieved using combination codes, such as algebraic or linear combination codes, for example. An exemplary algebraic combination code is discussed with reference to FIGS. 9–11.

Linear combination codes are obtained by appending parity check symbols to data symbols. The parity check symbols are linear combinations of one or more of these data symbols. Repetition codes are the simplest of such codes, and are obtained by repeating the data symbols multiple times. The fraction of the transmitted symbols that are parity check symbols is a measure of bandwidth efficiency of the code. The lower the fraction, the higher the efficiency. Other codes, however, may be more efficient than the simple repetition code. A parity check linear combination code for example, which attains a bandwidth expansion of zero as the code length tends to infinity, operates to suppress one interfering signal. Other exemplary combination codes will be discussed in greater detail momentarily with reference to FIGS. 5–8.

It should be noted that the techniques for utilizing time diversity to suppress interfering signals in accordance with the present invention may be used to complement conventional antenna diversity techniques. Antenna diversity techniques involve the use of multiple antennas at the receiver and/or transmitter for receiving or transmitting a signal, respectively. Antenna diversity may be obtained in the form of space diversity or polarization diversity, for example. Antenna diversity techniques are known, and may be available, for example, at a digital data receiver, such as the receiver illustrated in FIG. 1c.

The exemplary process begins upon reception of an input signal, input/output block 401. The input signal is representative, at least in part, of a communication between a first node and a second node. The input signal is a real physical signal. Recall that the communication between the first and second nodes may be direct, or indirect, such as that illustrated and discussed with reference to FIGS. 1a and 1b. The input signal preferably includes a first data signal and at least a second data signal. The first data signal includes at least one data set or code, such as a combination code. One exemplary linear combination code is a channel code, which more particularly introduces controlled redundancy into the sequence of transmitted data symbols. The introduction of controlled redundancy facilitates the reliable recovery of the transmitted information data symbols in the presence of interference and/or noise.

The various symbols which comprise the data subset are preferably subject to substantially independent fading. Independent fading as used herein is achieved by transmitting the data symbols relatively far apart in time or by transmitting the data symbols in un-correlated frequency bands. The foregoing may be accomplished using conventional techniques, including without limitation, interleaving/deinterleaving, frequency hopping and combinations thereof, for example.

At least a portion of a first data set, which preferably includes a training sequence, is recognized, processing block 402. The training sequence is preferably either a first portion or subset of the first data set, or maybe a separate data set. The second data set would precede at least a second data set. The second data set would represent an actual communication between the first and second nodes. The training sequence preferably is a known pattern of data symbols which is recognizable by a receiver, such as the exemplary digital data receiver of FIG. 1c. The training sequence may operate as a protocol, indicating one or more of the presence of the first data signal, the first data signal's frequency, and synchronization, for example. In alternate embodiments, the training sequence may include other suitable information.

At least a portion of the training sequence is used to generate a plurality of taps, processing block 403. A tap as used herein is a value, such as a complex value, which may be applied to the input signal to suppress any interfering signal and/or noise. Recall that noise is any disturbance that effects the communication signal which is not an interfering signal, such as the static heard during a telephone call.

The training sequence, and in particular the taps, is utilized to identify the first data signal within the input signal, processing block 404. Tap generation is preferably accomplished using an adaptive algorithm, such as a recursive least squares algorithm, for example. This algorithm may be used to force the output of a combiner to a desired signal as determined by the training sequence. In other words, the algorithm uses the fixed training sequence to discern how the first data signal and the interfering signal are combined, i.e., the manner in which the first data signal may be separated from the interfering data signal. An exemplary algorithm is discussed in "Square Root Kalman Filtering for High Speed Data Received over Fading Dispersive HF Channels", by F. M. Hsu, IEEE Trans. Inform. Theory, Vol. IT-28, No. 5, pp 753–763 (September 1982), which is incorporated herein by reference.

The first data signal is preferably isolated with respect to the second data signal, or if more than one interfering signal remains, with respect to the remaining interfering signals, processing block 405. Isolate as used herein shall include without limitation, divide, filter, part, partition, section, segregate, separate, sever, sort, and the like, or combinations thereof. Particular ones of the plurality of taps are preferably used to substantially eliminate the effect of interference and/or noise on the first data signal. Exemplary identification and isolation steps will be discussed in greater detail momentarily.

An output signal is generated, processing block 406. The output signal is a real physical signal and represents at least a portion of the first data signal.

In alternate embodiments, the present invention adaptively differentiates between particular ones of a plurality of available linear or algebraic combination codes or patterns within which the first data signal is received. This is an important advantage when considering that more complex linear channel codes are preferred when the likelihood of multiple interfering signals is higher. Consider for example the utilization of a cellular telephone on a city street corner. It may be presumed that the number of signals interfering with the reception of a desired signal will be relatively higher during the day as compared with the number of interfering signals during the night. The ability of a data receiver or a processor to adaptively decode a received input signal provides the flexibility to receive signals using various combination codes.

The reception and recognition of an input signal transmitted using a particular combination code or pattern is preferably accomplished by a handshake between the transmitter and the receiver during call set up. A base station preferably has knowledge of the current usage, and may accordingly request/instruct a node to use a particular combination code to suppress substantially all dominant interferers. The training sequence is preferably designed in accordance with the chosen combination code and is used to identify the appropriate tap settings in accordance with the principles of the present invention.

Figure 5:
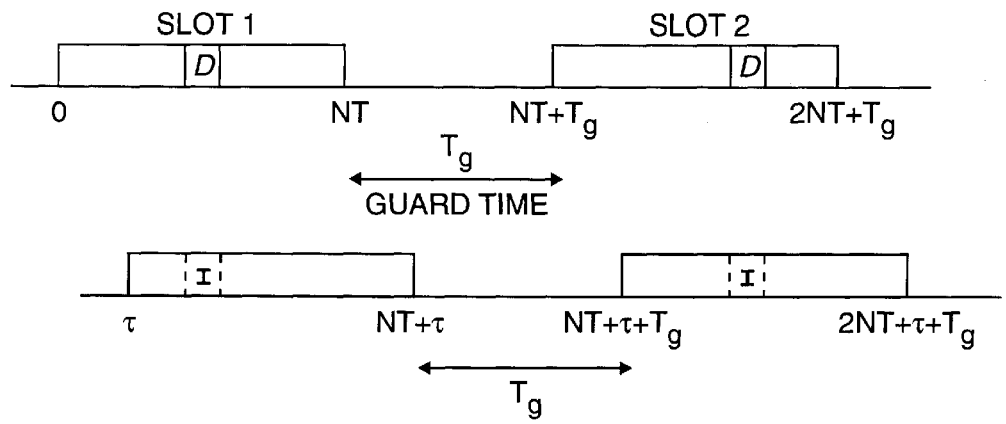
FIG. 5 illustrates a conceptual diagram of a frame synchronous transmission.

Turning to FIG. 5, there is illustrated a frame synchronous transmission. A simple R=1/2 repetition code is considered wherein the code symbols are one of M possible values, i.e., an M-ary signal. Note that slots 1 and 2 carry the same data symbol D at the i-th symbol position in each slot, and that an interferer, I, transmits using the same code. The data packets in this example are transmitted along independent fading channels. This is preferably accomplished either by transmitting the data packets far apart in time (or frequency) or by making use of multiple transmit antennas separated sufficiently and transmitting the packets in an orthogonal manner. Generally, if the channels are not independent, then performance may degrade depending upon the correlation between fades. The present scheme functions in the absence of fading using independent transmission.

The interferer channels are preferably assumed not only independent of one another but also independent from the desired transmission because the exemplary interferer is not co-located with the desired signal. The channels over which the data packets are transmitted are assumed non-frequency selective, and ideal coherent demodulation is assumed at an ideal sampling instant corresponding to a device data symbol D (in slots 1 and 2). The received signal is given by $r_1 = a_1 D + b_1 I$, and $r_2 = a_2 D + b_2 I$, wherein $r_j$ is the received sample in slot j at the sampling instant, D is the desired data symbol, and I is the value of an interfering signal, both D and I are given at the sampling instant. In general, I need not be a data symbol since only frame synchronization and not symbol synchronization is assumed. $a_1$, $a_2$, $b_1$ and $b_2$, are channel gains, which are preferably modeled as slow-varying complex Gaussian variates, although this is not necessary.

Figure 6:
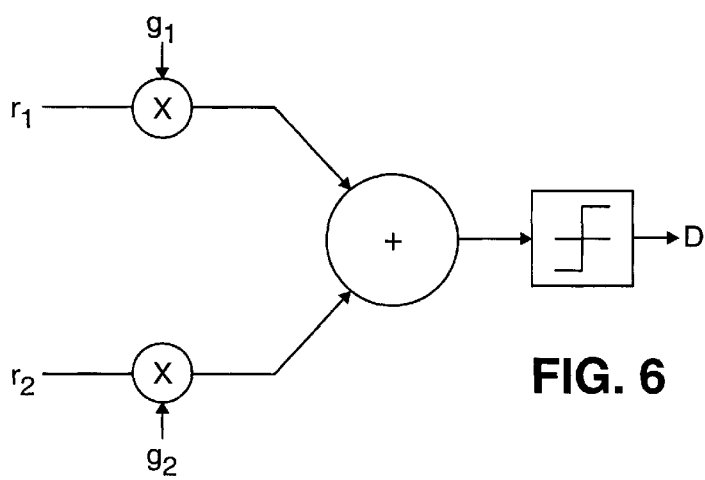
FIG. 6 illustrates a block diagram of a linear combiner for an R=1/2 repetition code.

In accordance with the FIG. 4 process, the received signals are linearly combined as shown in FIG. 6 to yield a decision statistic. Two linear combiner coefficients g1 and g2 are chosen so that the interference at the output of the combiner is driven to zero and yields an output equal to the desired data symbol, D. Solving for I in one of the preceding equations and substituting in the other equation, yields, $$g_1 r_1 + g_2 r_2 = D,$$

wherein $$g_1 = \frac{b_2}{b_2 a_1 - b_1 a_2}, \text{ and}$$

$$g_2 = \frac{b_1}{b_2 a_1 - b_1 a_2}.$$

Choosing combiner tap weights substantially equal to $g_1$ and $g_2$ causes the interference to be eliminated in the absence of any additional disturbance, i.e., noise. In the presence of noise, the mean squared error between the combiner output and D, i.e., $g_1$ and $g_2$, is preferably minimized such that $$E|g_1 r_1 + g_2 r_2 - D|^2$$

is minimized. $g_1$ and $g_2$ are preferably chosen therefore such that:

$$\sum_{i=1}^{N} |g_1 r_{1i} + g_2 r_{2i} - D_i|^2$$

is minimized wherein $D_i$, for $i=1, \ldots, N$, is a training sequence of length N, $D_i$ is the ith training symbol, and $r_{1i}$ and $r_{2i}$ are the corresponding received symbols.

The tap weights are preferably derived during the processing of the training sequence, where a known data sequence is received as previously discussed. For example, a known sequence of data symbols is preferably attached, appended, inserted or the like as a header. In other words, $g_1$ and $g_2$ are computed using knowledge of the desired data sequence.

Assuming for example that there are N-1 interferers at the ideal sampling instant. It should be noted that a repetition code of length N may generally be used, and the received sample in time slot m is defined by:

$$r_m = a_m D + b_{m,1} I_1 + \ldots b_{m,N-1} I_{N-1} \quad m=1, \ldots, N,$$

wherein D is the desired data symbol, $I_1, \ldots, I_{N-1}$ are the interfering symbols, and $a_m$, $b_{m,i}$, for $i=1, \ldots, N-1$, are the complex gains affecting each of the $m^{th}$ transmitted data packets. The zero forcing solution is found by finding a set of tap-weights, $g_1, \ldots, g_N$, which are a solution to:

$$\begin{bmatrix} a_1 & a_2 & \ldots & a_N \\ b_{1,1} & b_{2,1} & \ldots & b_{N,1} \\ \vdots & \vdots & & \vdots \\ b_{1,N-1} & b_{2,N-1} & \ldots & b_{N,N-1} \end{bmatrix} \begin{bmatrix} g_1 \\ \vdots \\ g_N \end{bmatrix} = \begin{bmatrix} 1 \\ 0 \\ 0 \\ \vdots \\ 0 \end{bmatrix},$$

wherein the resulting output is equal to the desired data symbol D.

Figure 7:
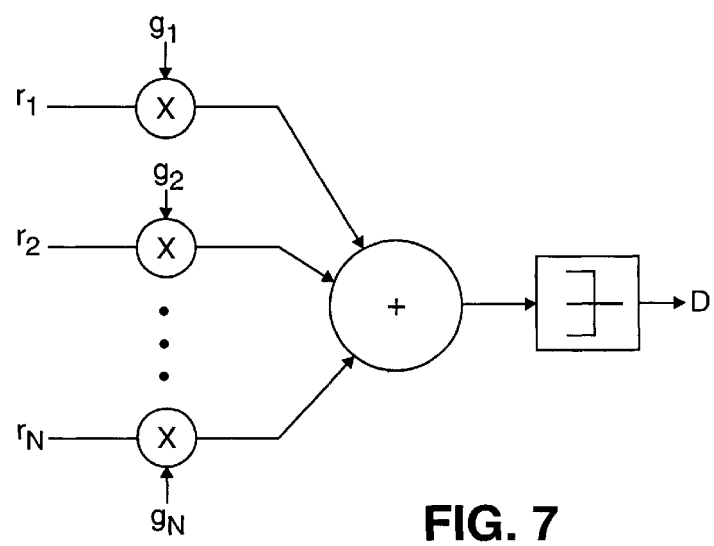
FIG. 7 illustrates a block diagram of a linear combiner for an R=1/N repetition code.

Turning to FIG. 7, there is illustrated the combiner for the R=1/N repetition code. Note that the use of this repetition code results generally in a rate decrease by a factor of N. For small enough N, such as N=2, this rate decrease can be recovered completely by squaring the size of the signal constellation. It should be noted that in particular applications, the effect of interference suppression may be used to improve frequency reuse.

Consider a linear combination code of (N-1)/N, wherein N equals 3. The R=2/3 code is formed by taking two data symbols $D_1$ and $D_2$ and forming a third data symbol $D_1 + D_2$. It is assumed that a single interferer is present. The interferer also transmits $I_1$, $I_2$ and $I_1 + I_2$. It is again assumed for illustrative purposes that the three data symbols, $D_1$, $D_2$, and $D_1 + D_2$, and the three interfering symbols, $I_1$, $I_2$ and $I_1 + I_2$, are transmitted along independent channels. The resulting received symbols are $r_1 = a_1 D_1 + b_1 I_1$, $r_2 = a_2 D_2 + b_2 I_2$, and $r_3 = a_3 (D_1 + D_2) + b_3 (I_1 + I_2)$, wherein $a_1$, $a_2$, $a_3$, $b_1$, $b_2$, and $b_3$ are complex path gains. The three symbols are linearly combined to eliminate interference. Solving for $I_1$ and $I_2$ in the first and second of the preceding equations, respectively, and then substituting the resulting values into the third equation yields, $$g_1 r_1 + g_2 r_2 + g_3 r_3 = g_4 D_1 + g_5 D_2,$$

wherein $$g_1 = \frac{b_3}{(a_1 b_3 - a_3 b_1)},$$

$$g_2 = \frac{b_3 b_1}{b_2 b_3 a_1 - a_3 b_1 b_2},$$

$$g_3 = \frac{b_1}{(a_3 b_1 - b_3 a_1)},$$

$$g_4 = 1, \text{ and}$$

$$g_5 = \frac{b_1}{b_2} \frac{(a_2 b_3 - b_2 a_3)}{b_3 a_1 - a_3 b_1}.$$

In practice, $g_1$, $g_2$, $g_3$, $g_4$ and $g_5$ are determined by transmitting a training signal. The training signal is of the form $\{D_{1i}\}_{i=1}^{N}$ which is transmitted along the first channel, $\{D_{2i}\}_{i=1}^{N}$, which is transmitted along the second channel, and $\{D_{1i} + D_{2i}\}_{i=1}^{N}$ which is transmitted along the third channel. The decoder computes $g_1$, $g_2$, $g_3$, $g_4$ and $g_5$ to minimize $$\sum_{i=1}^{N} (g_1 r_{1i} + g_2 r_{2i} + g_3 r_{3i} - g_4 D_{1i} - g_5 D_{2i})^2,$$

wherein $r_{1i}$, $r_{2i}$ and $r_{3i}$ are the ith received symbols corresponding to the transmission of $D_{1i}$, $D_{2i}$ and $D_{1i} + D_{2i}$.

In accordance with equalization theory, $g_1$, $g_2$ and $g_3$ are feed-forward taps, and $g_4$ and $g_5$ are feed-back taps. The output of the feed-forward combiner is a linear combination (coefficients $g_4$ and $g_5$) of the transmitted data symbols $D_1$ and $D_2$. For every pair of data symbols $D_1$ and $D_2$, the receiver forms the difference between the output of the feed forward-linear combiner and the output of the feed-back filter. The data pair resulting in the smallest error is selected using a least squares criterion as previously discussed. When using this criterion, it should be noted, that either $g_4$ or $g_5$ is preferably restricted to 1, otherwise the tap settings will converge substantially to zero.

Assume for example that there are two receivers wherein a first receiver has $g_4$ set to 1 and a second receiver has $g_5$ set to 1. Generally, both receivers yield different errors. An appropriate receiver is chosen to make a decision. Assuming that the least squared error when $g_4$ is 1 is mse1 and when $g_5$ is set to 1 is $mse_2$, the error associated with $D_1$ when $g_4$ is 1 is mse1 and for $D_2$ is $mse_1/g_5$. Similarly, when $g_5$ is 1, the error associated with $D_1$ is $mse_2/g_4$ while for $D_2$ is $mse_2$. Thus, the minimum error for $D_1$ is $\min(mse_1, mse_2/g_4)$, while the minimum error for $D_2$ is $\min(mse_1/g_5, mse_2)$. The first receiver is chosen for making decisions for $D_1$ if $mse_1$ is smaller than $mse_2/g_4$, otherwise the second receiver is chosen. Similarly, the first receiver is chosen for making decisions about $D_2$ if $mse_1/g_5$ is smaller than $mse_2$, otherwise the second receiver is chosen. The duel receiver decoding approach may be preferred over single receiver decoding and is accomplished by setting either $g_4$ or $g_5$ to 1.

Figure 8:
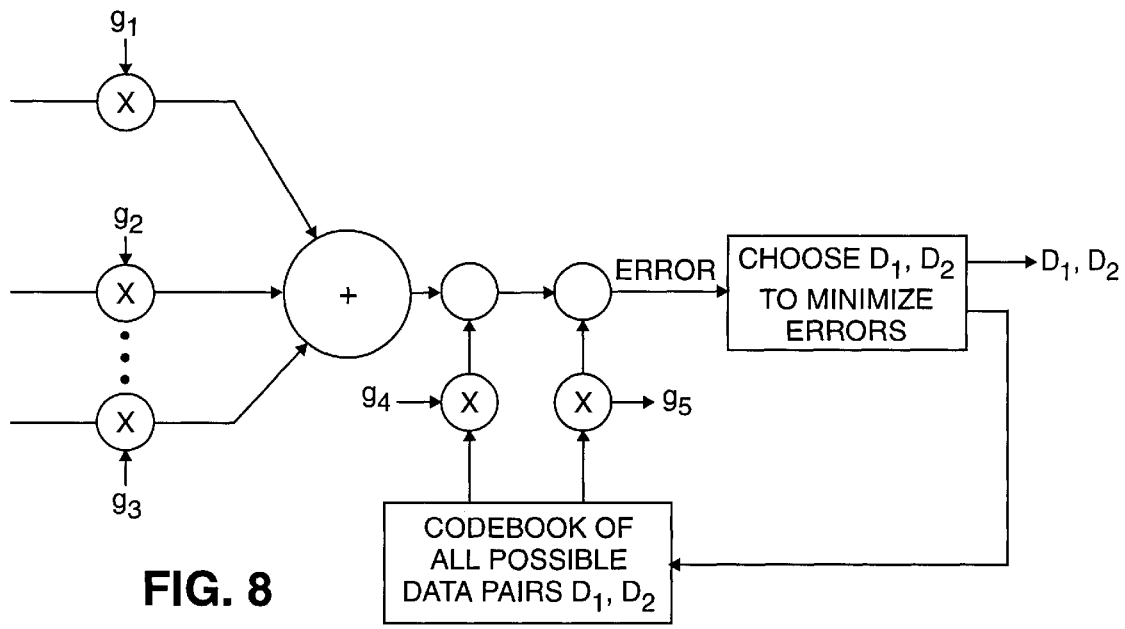
FIG. 8 illustrates a block diagram of a linear combiner for an R=2/3 repetition code.

Turning to FIG. 8, there is illustrated a combiner structure for the R=2/3 code. Note that this code is not the only R=2/3 code for which cancellation of a single interferer is possible. Any code of the form $t_1 = \alpha_1 D_1 + \alpha_2 D_2$,
$t_2 = \beta_1 D_1 + \beta_2 D_2$, and
$t_3 = \gamma_1 D_1 + \gamma_2 D_2$, wherein the ratios, $$\frac{\alpha_1}{\alpha_2},$$

$$\frac{\beta_1}{\beta_2}, \text{ and}$$

$$\frac{\gamma_1}{\gamma_2},$$

may not be equal.

In other words, each coordinate $t_i$ must independently convey some new information. All codes of this class are preferably planar, producing two pairs of antipodal coordinates. Preferred codes have minimized amplitude variations among the coordinates ($t_1$, $t_2$, $t_3$), while the power normalized minimum distance of the code is maximized. Such codes are desirable because of low peak to average power as well as good error performance.

In accordance with the foregoing, the illustrated R=2/3 code is preferably described by $\alpha_1=1$, $\alpha_2=0$, $\beta_1=0$, $\beta_2=1$, $\gamma_1=1$, and $\gamma_2=1$. The power normalized squared minimum distance is 6. There is a substantially infinite variation in the ratio of the amplitudes since $t_3$, for example, may assume values $\{-2,0,2\}$ if $D_1$ and $D_2$ assume values $\{-1,1\}$.

Consider a 2/5 linear combination code for suppressing two interferers, for example. A transmitted code word consists of symbols $D_1$, $D_2$, $D_1$, $D_2$, $D_1+D_2$. Two interfering codewords are given by $I_{11}$, $I_{12}$, $I_{11}$, $I_{12}$, $I_{11}+I_{12}$ and $I_{21}$, $I_{22}$, $I_{21}$, $I_{22}$ and $I_{21}+I_{22}$, respectively. The received data symbols are given by, $r_1 = a_1 D_1 + b_2 I_{11} + c_1 I_{21}$,
$r_2 = a_2 D_2 + b_2 I_{12} + c_2 I_{22}$,
$r_3 = a_3 D_1 + b_3 I_{11} + c_3 I_{21}$,
$r_4 = a_4 D_2 + b_4 I_{12} + c_4 I_{22}$, and
$r_5 = a_5(D_1+D_2) + b_5(I_{11}+I_{12}) + C_5(I_{21}+I_{22})$.

A suitable feed-forward linear combiner chooses coefficients such that the interferers are nulled. This is preferably achieved with tap weights $g_1$, $g_2$, $g_3$, $g_4$, and $g_5$, satisfying:

$$\begin{bmatrix} b_1 & 0 & b_3 & 0 & b_5 \\ c_1 & 0 & c_3 & 0 & c_5 \\ 0 & b_2 & 0 & b_4 & b_5 \\ 0 & c_2 & 0 & c_4 & c_5 \\ a_1 & 0 & a_3 & 0 & a_5 \end{bmatrix} \begin{bmatrix} g_1 \\ g_2 \\ g_3 \\ g_4 \\ g_5 \end{bmatrix} = \begin{bmatrix} 0 \\ 0 \\ 0 \\ 0 \\ 1 \end{bmatrix}.$$

The resulting output is a linear combination of the desired data symbols $D_1$ and $D_2$ and is given by $g_6 D_1 + g_7 D_2$ wherein, $g_6 = g_1 a_1 + g_3 a_3 + g_5 a_5$, and
$g_7 = g_2 a_2 + g_4 a_4 + g_5 a_5$.

The four linear combinations of data symbols are searched to find the particular one that is closest to the output of the linear combiner. As before, the combiner coefficients are preferably determined using a training sequence and a least square procedure.

Consider a general N/K linear combination code consisting alternatively of K information symbols and N code symbols, which can suppress up to (N−1)/K interferers. Each interferer has K unknown information symbols. Assuming that K divides (N−1) and that there are (N−1)/K interferers, there are then (N−1) unknown interfering symbols. N−1 linearly independent equations are needed in terms of the unknowns to solve for all the interfering symbols in terms of the received symbols and the desired data symbols. All interfering symbols are substituted into the N-th equation to yield an output which is a linear combination of the K desired data symbols alone.

As block length goes to infinity, one interferer may suitably be suppressed with a code rate of R=1, two interferers may suitably be suppressed with a code rate of R=1/2, three interferers may suitably be suppressed with a code rate of R=1/3, etc.

Figure 9:
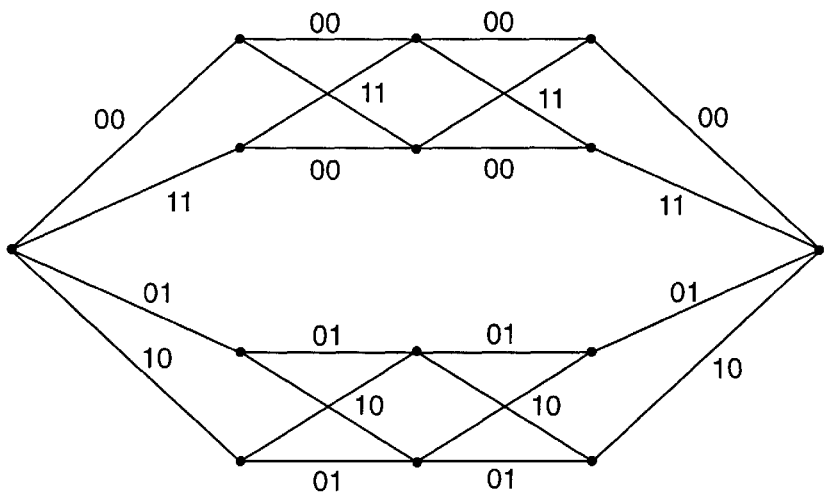
FIG. 9 illustrates a trellis diagram of an exemplary realization of a (8,4) Hamming Code.
Figure 10:
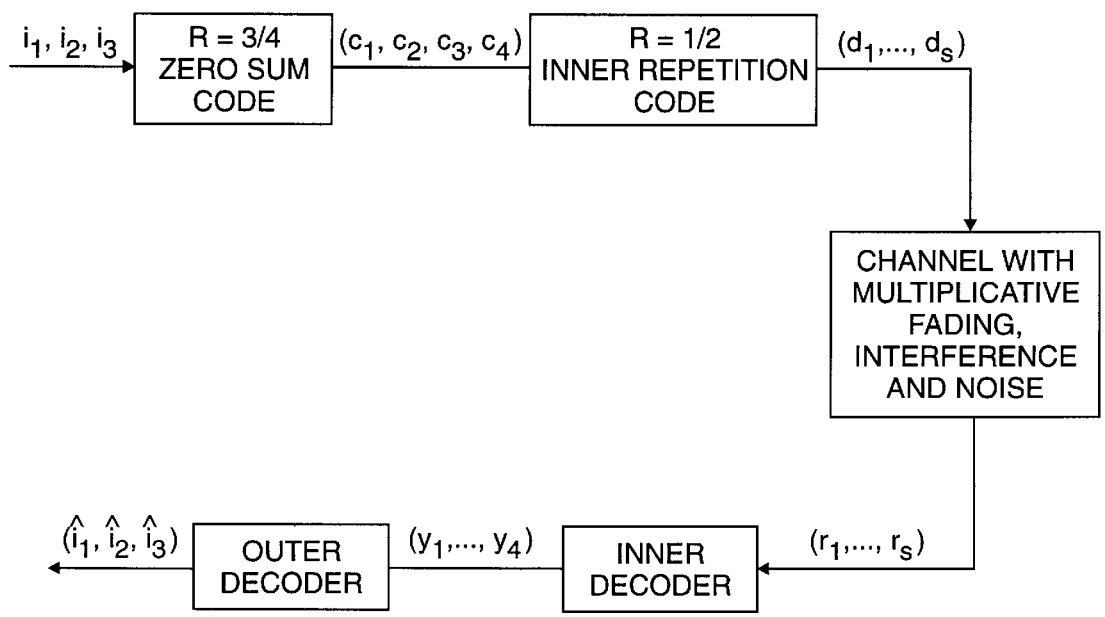
FIG. 10 illustrates a concatenated code consisting of a R=1/2 inner code and a R=3/4 outer code.
Figure 11:
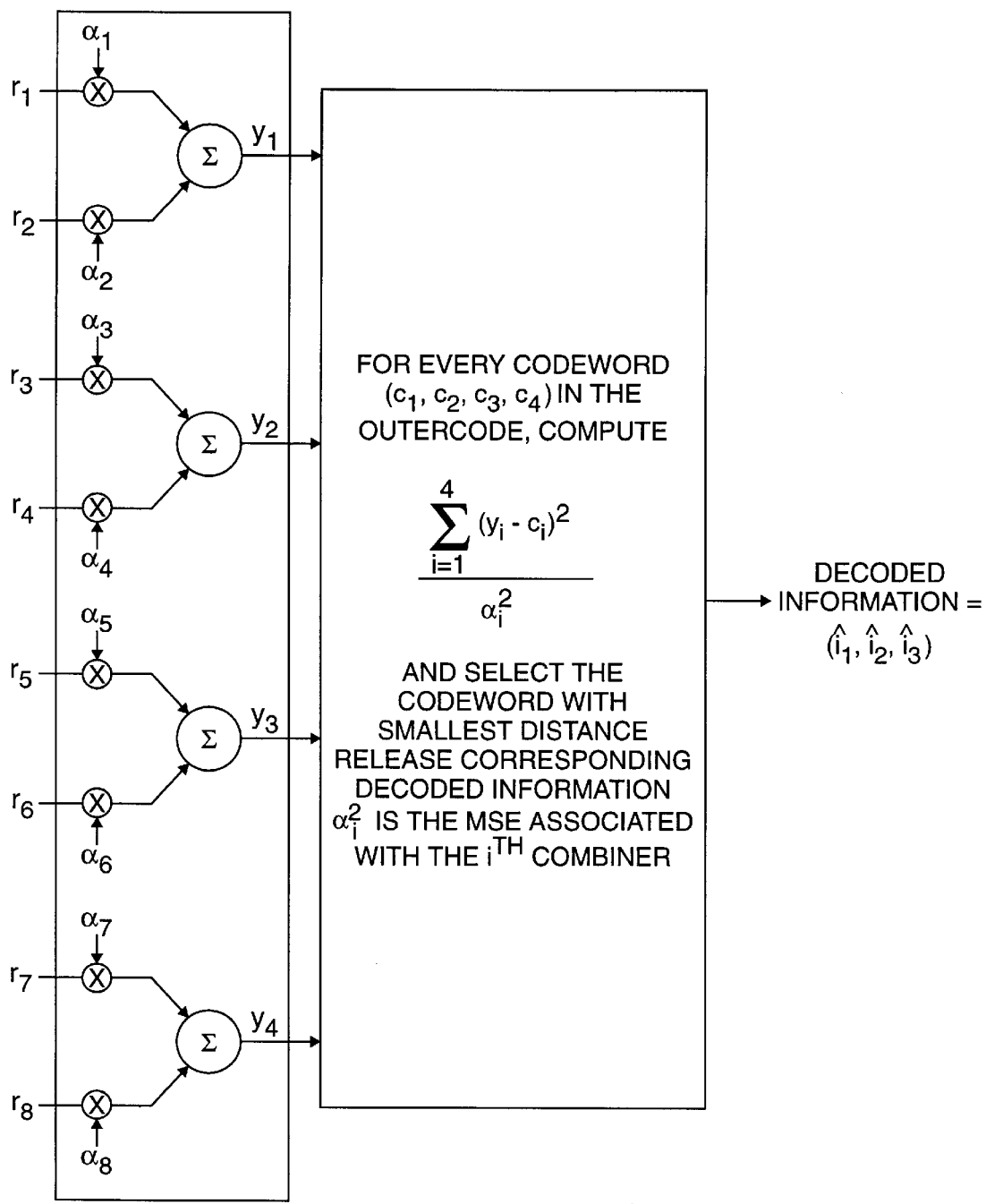
FIG. 11 illustrates a block diagram of a linear combiner for an (8,3) sub-code of the (8,4) Hamming Code.

The codes considered thus far have been linear combination codes, in turning to FIG. 9, attention is directed to algebraic combination codes, wherein a trellis diagram of a particular realization of an (8,4) extended Hamming Code is illustrated. Consider decoding a transmitted codeword which belongs to the upper half of the trellis for both a desired data signal and an interfering signal. This code is an (8,3) sub-code of the (8,4) Hamming code and can be thought of as a concatenated code consisting of a R=1/2 inner code and a R=3/4 outer code as is illustrated in FIG. 10. This code may be used to suppress one interferer and assist in control of Rayleigh fading. In other words, after suppressing one interferer, communications remain reliable even if fading results in incorrect decoding of the data symbols by the linear combiner which suppresses interference.

Let the ith received signal be $r_i = a_i d_i + b_1 I_i + n_i$, $i = 1, \ldots, 8$ with $D_j = D_{j+1}$ and $I_j = I_{j+1}$, $j = 1, 3, 5, 7$.

Combine $r_i$ and $r_{i+1}$ with coefficients $\alpha_i$ and $\alpha_{i+1}$, $i=1,3,5,7$ so that the output is substantially equal to $D_i$ in the absence of noise, or more appropriately, close to $D_i$ in the presence of noise. An exemplary linear combiner is illustrated FIG. 11. The outputs ($y_1, \ldots, y_4$) of the linear code are processed by the outer decoder. Preferably, the outer decoder computes the squared Euclidean distance between ($y_1, \ldots, y_4$) and every possible outer codeword ($c_1$, $c_2$, $c_3$, $c_4$). The outer codeword with the least distance is chosen as the transmitted codeword and the corresponding information bits for the decoded output.

The decoding of the (8,3) sub-code is extended to the (8,4) Hamming Code using the trellis of FIG. 9. Note that on any trellis branch, it is now possible for $D_i = D_{i+1}$ or $D_i = -D_{i+1}$, $i=1,3,5,7$. This holds for the interferer as well.

For example, assume $I_i = I_{i+1}$, $i=1,3,5,7$. The received symbols at time i and i+1 are $r_i = a_i d_i + b_i I_i + n_i$, and $r_{i+1} = a_{i+1} d_{i+1} + b_{i+1} I_{i+1} + n_{i+1}$ The coefficients $\alpha_i$ and $\alpha_{i+1}$ are used to combine $r_i$ and $r_{i+1}$ such that the interference is suppressed. The output, however, is $D_i$ if $D_i = D_{i+1}$ or $k_i D_i$ if $D_i = -D_{i+1}$ where k is a complex constant that is found during an initial training procedure. The decoder, $i=1,3,5,7$ computes $$\sum_{i=1,3,5,7} [\alpha_i r_i + \alpha_{i+1} r_{i+1} - D_i]^2$$

if the codeword satisfies $D_i = D_{i+1}$, i=1,3,5,7 and for the codewords satisfying $D_i = -D_{i+1}$, it computes $$\sum_{i=1,3,5,7} |\alpha_i r_i + \alpha_i r_{i+1} - k_i d_i|^2.$$

The codeword with the minimum distance is the decoded output.

Alternatively, assume that $I_i = -I_{i+1}$, wherein i=1,3,5,7. The received symbols are $r_i = a_i D_i + b_i I_i + n_i$ and $r_{i+1} = a_{i+1} D_{i+1} + b_{i+1} I_{i+1} + n_{i+1}$.

Assuming $D_i = -D_{i+1}$, the receiver computes $$\sum_{i=1,3,5,7} |\alpha_i r_i - \alpha_i r_{i+1} - D_i|^2.$$

When $D_i = D_{i+1}$, the receiver computes $$\sum_{i=1,3,5,7} |\alpha_i r_i - \alpha_i r_{i+1} - k_i D_i|^2.$$

The minimum result of the results of the preceding equations is used to determine the decoded codeword and the corresponding output of information bits.

To determine $k_i$, a training sequence is used such that $D_i = D_{i+1}$ for the desired data i=1, 3, 5, 7, . . . ,N. For the interfering signals, $I_i = I_{i+1}$, i=1, . . . ,N/2 and $I_i = -I_{i+1}$, i=N/2+1, . . . ,N. Over the first N/2 symbols, the receiver computes $\alpha_i$ and $\alpha_{i+1}$ such that $$\sum_{j=1}^{N/2} |\alpha_i r_{ij} + \alpha_{i+1} r_{i+1,j} - D_i|^2$$

is minimized. For the remaining N/2 symbols, the receiver determines $k_i$ such that $$\sum_{j=1}^{N/2} |\alpha_i r_i - \alpha_{i+1} r_{i+1} - k_i D_i|^2$$

is minimized. The training sequence length thus doubles. The training sequence can therefore be allocated to the two users following call set up.

Although the present invention and its advantages have been described in detail, it should be understood that various changes, substitutions and alterations can be made herein without departing from the spirit and scope of the invention.

We claim:

1. An apparatus for decoding communication signals, said apparatus comprising:

a receiver for receiving an input signal representing a communication between a first node and a second node, said input signal including a desired data signal encoded using one of a linear combination code and an algebraic combination code, and one or more interfering signals; and processing means for decoding said input signal to produce an output signal representing at least a portion of said desired data signal, said processing means operable to identify at least a portion of said desired data signal within said input signal and to isolate said desired data signal from said one or more interfering signals to produce said output signal.

2. The apparatus as set forth in claim 1 wherein said desired data signal includes at least a first data set, and said processing means is further operable to recognize said first data set.

3. The apparatus as set forth in claim 2 wherein said processing means is further operable to utilize said recognized first data set to identify said desired data signal within said input signal.

4. The apparatus as set forth in claim 1 wherein said processing means is further operable to generate said output signal.

5. The apparatus as set forth in claim 1 wherein said processing means includes at least one processing unit.

6. The apparatus as set forth in claim 1 wherein said apparatus is implemented in a telephony system.

7. An apparatus for decoding communication signals, said apparatus comprising:

a receiver for receiving an input signal representing a communication between a first node and a second node, said input signal including a desired data signal encoded using a combination code and one or more interfering signals, said desired data signal including at least a first data set which includes a training sequence; and processing means for decoding said input signal to produce an output signal representing at least a portion of said desired data signal, said processing means operable to identify at least a portion of said desired data signal within said input signal, to recognize said first data set, and to isolate said desired data signal from said one or more interfering signals to produce said output signal.

8. The apparatus as set forth in claim 7 wherein said processing means is further operable to generate a plurality of taps utilizing said training sequence.

9. The apparatus as set forth in claim 8 wherein said processing means is further operable to utilize at least one of said plurality of taps to isolate at least a portion of said desired data signal from said one or more interfering signals.

10. The apparatus as set forth in claim 8 wherein at least a portion of said input signal is affected by noise, and said processing means is further operable to utilize at least one of said plurality of taps to substantially eliminate the affect of said noise and to isolate said desired data signal from said one or more interfering signals.

11. A method for decoding communication signals, said method comprising the steps of:

receiving an input signal representing a communication between a first node and a second node, said input signal including a first data set encoded using one of a linear combination code or an algebraic combination code, and a second data set;

identifying at least a portion of said first data set within said input signal;

suppressing said second data set with respect to said first data set; and producing an output signal representing said first data set.

12. The method as set forth in claim 11 wherein said first data set includes at least a first data subset, and said method further includes the step of recognizing said first data subset.

13. The method as set forth in claim 12 wherein said method further includes the step of utilizing said recognized first data subset to identify at least a portion of said first data set within said input signal.

14. A method for decoding communication signals, said method comprising the steps of:

receiving an input signal representing a communication between a first node and a second node, said input signal including a first data set encoded using a combination code, a second data set, and a training sequence;

identifying at least a portion of said first data set within said input signal;

recognizing said training sequence;

suppressing said second data set with respect to said first data set; and producing an output signal representing said first data set.

15. The method as set forth in claim 14 further comprising the step of utilizing said recognized training sequence to generate a plurality of taps.

16. The method as set forth in claim 15 further including the step of using at least one of said plurality of taps to suppress said second data set with respect to said first data set.

17. The method as set forth in claim 15 wherein at least a portion of said input signal is affected by noise, and said method further includes the step of using ones of said plurality of taps to substantially eliminate the affect of said noise and to suppress said second data set with respect to said first data set.

18. An apparatus for decoding communications signals, said apparatus comprising:

an input port operative to receive an input signal representing a communication between a first node and a second node, said input signal including a desired data signal encoded using a combination code and at least one interfering signal, said combination code including at least a training sequence;

a processor operative to recognize said training sequence, to utilize said recognized training sequence to identify at least a portion of said desired data signal and to generate a plurality of taps, and to utilize at least one of said plurality of taps to isolate at least said portion of said desired data signal from said one or more interfering data signals; and an output port operative to produce an output signal representing at least said portion of said isolated desired data signal.

19. The apparatus as set forth in claim 18 wherein said input signal is affected by noise and said processor is further operative to utilize at least one of said plurality of taps to substantially eliminate the affect of said noise.

20. An apparatus for decoding communication signals, said apparatus comprising:

a receiver for receiving an input signal representing a communication between a first node and a second node, said input signal including a desired data signal encoded using a combination code and one or more interfering signals, wherein said input signal may be received in one of a plurality of combination code formats; and processing means for decoding said input signal to produce an output signal representing at least a portion of said desired data signal, said processing means operable to identify at least a portion of said desired data signal within said input signal, to determine in which one of said plurality of formats said input signal is received, and to isolate said desired data signal from said one or more interfering signals to produce said output signal.

21. A method for decoding communication signals, said method comprising the steps of:

receiving an input signal which may be received in one of a plurality of combination code formats, said input signal representing a communication between a first node and a second node, said input signal including a first data set encoded using a combination code which is one of said plurality of code formats and a second data set;

identifying at least a portion of said first data set within said input signal;

recognizing in which one of said plurality of formats said input signal is received;

suppressing said second data set with respect to said first data set; and producing an output signal representing said first data set.

22. An apparatus for decoding communication signals, said apparatus comprising:

a receiver for receiving an input signal representing a communication between a first node and a second node, said input signal including a desired data signal encoded using a combination code and one or more interfering signals, processing means for decoding said input signal to produce an output signal representing at least a portion of said desired data signal, said processing means operable to identify at least a portion of said desired data signal within said input signal and to isolate said desired data signal from said one or more interfering signals to produce said output signal; and means for storing a plurality of processing system instructions for directing said processing means to decode said input signal to produce said output signal.

23. The apparatus as set forth in claim 22 wherein said processing means is further operable to retrieve and execute selected ones of said processing system instructions.

* * * * *